United States Patent

Kellner

[11] 4,226,518
[45] Oct. 7, 1980

[54] PHOTOGRAPHIC CAMERA HAVING LONG FOCAL LENGTH OBJECTIVE

[76] Inventor: Ferdinand Kellner, Spittelmüllerstr. 6, 8940 Memmingen, Fed. Rep. of Germany

[21] Appl. No.: 38,119

[22] Filed: May 11, 1979

[51] Int. Cl.³ .................. G03B 17/48; G03B 19/12; G03B 17/00
[52] U.S. Cl. .................... 354/79; 354/152; 354/293
[58] Field of Search ............ 354/79, 219, 81, 224, 354/286, 150, 152, 155, 293; 114/340; 350/52

[56] References Cited

U.S. PATENT DOCUMENTS

| | | | |
|---|---|---|---|
| 1,492,583 | 5/1924 | Steinle | 114/340 X |
| 2,165,512 | 7/1939 | Schofield | 354/293 X |
| 2,370,611 | 2/1945 | DuMais | 354/293 X |
| 2,907,253 | 10/1959 | McDonald | 354/293 X |
| 3,008,396 | 11/1961 | Mito | 354/152 X |
| 3,914,032 | 10/1975 | Takano et al. | 354/62 X |
| 4,037,238 | 7/1977 | Leitz et al. | 354/152 |
| 4,131,354 | 12/1978 | Hagiwara | 354/152 X |

FOREIGN PATENT DOCUMENTS

| | | | |
|---|---|---|---|
| 1145377 | 3/1963 | Fed. Rep. of Germany | 114/340 |
| 3549 | of 1915 | United Kingdom | 350/52 |

Primary Examiner—Donald A. Griffin
Attorney, Agent, or Firm—Holman & Stern

[57] ABSTRACT

In a photographic camera having a long focal length objective, both the objective and a tubular viewfinder extend vertically upwardly adjacent one another from the film carrying part of the camera which facilitates support of the camera in use. Preferably the objective and viewfinder are formed as a periscope arrangement with the light-admitting end of the objective being higher than the eyepiece of the viewfinder.

5 Claims, 2 Drawing Figures

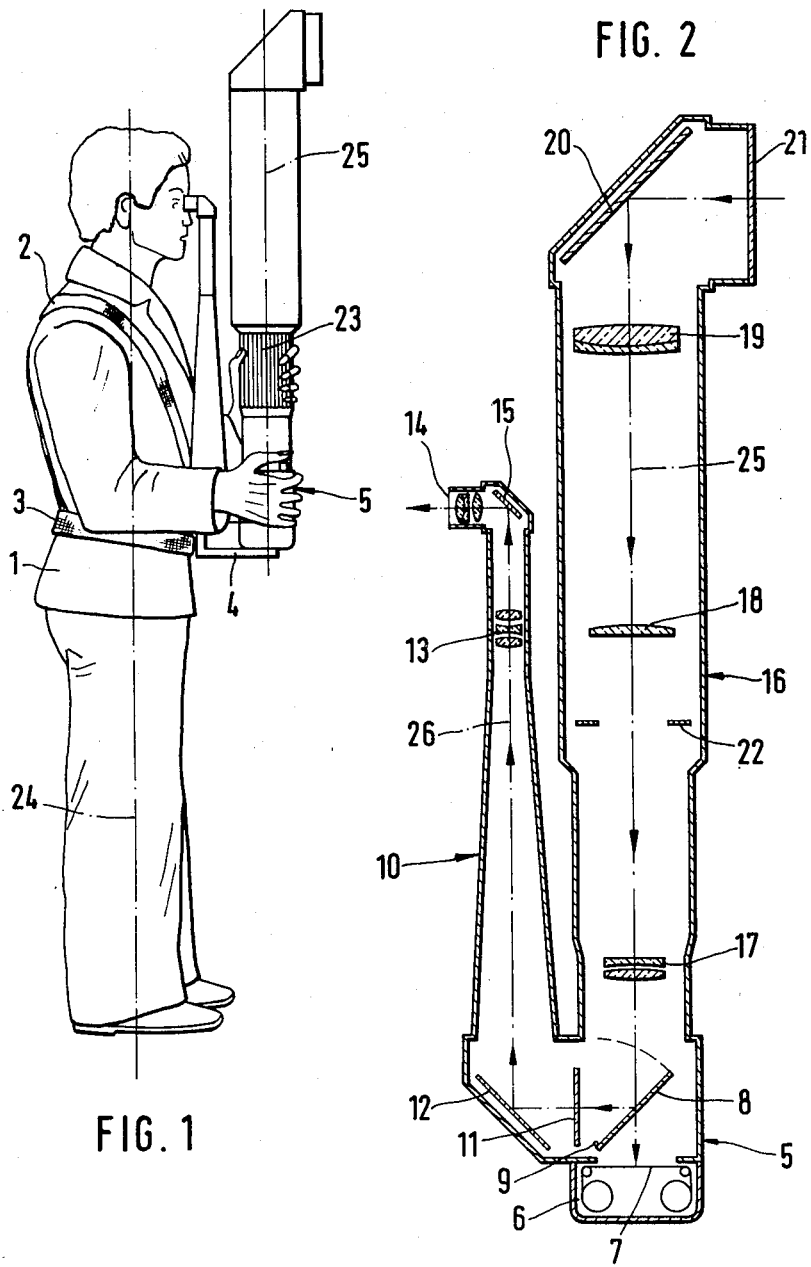

PHOTOGRAPHIC CAMERA HAVING LONG FOCAL LENGTH OBJECTIVE

BACKGROUND OF THE INVENTION

This invention relates to a photographic camera having a long focal length objective and a tubular viewfinder.

Photographic cameras with long focal length objectives are of considerable weight. In use, the unit comprising the objective and the camera must be held at eye level and directed towards the object which is being photographed. This holding at eye level in some cases must be maintained for a long time, since for example, in sports photography, the image must be captured at a very precise instant. The handling of a camera with a long focal length objective is therefore often fatiguing. At the same time, it is important that the objective and the camera be held very steady during release of the shutter.

Chest and shoulder braces are known by which the manipulation of such photographic assemblies is somewhat facilitated. However, since the center of gravity of the unit formed by the camera and the objective is located at some distance from the body of the photographer, where the apparatus extends horizontally from the photographer's eye, such supports are of limited effectiveness.

The additional use of a tripod is often not possible due to the local situation, and additionally, has the disadvantage that the mobility to direct the device at the object is reduced. In addition, a tripod is an extra load for the photographer if he wishes to change location.

There have been suggestions as to how to shorten the overall length of the objective lens assembly. This can be accomplished, for example, by the use of special optical systems in which the objective is in the form of a reflecting objective and/or the light path is deflected by means of a mirror or mirrors. The possible reduction in overall length by these techniques is however, limited. Furthermore, they have the disadvantage of increasing the diameter and weight of theobjective. They do not achieve a decrease in the burden on the photographer and moreover, such shortened objectives are also accompanied by optical disadvantages.

An object of this invention is to provide a photographic camera having a long focal length objective which as a result of its structure is less fatiguing on the photographer to handle than present designs. In particular, it is an object of the invention to provide a system or configuration which does not diminish the quality of the resulting photograph.

SUMMARY OF THE INVENTION

According to the invention, in photographic camera apparatus including a tubular objective of long focal length, the viewfinder is also in the form of a tube located next to the objective. In use, both the tubular objective and the viewfinder extend upwardly adjacent one another from the film carrying part of the apparatus and a light-deflecting mirror assembly is provided at the junction between the objective and the viewfinder for directing light from the light-admitting end of the objective to the viewfinder.

With this arrangement, the photographer does not have to hold the whole camera up to his eye or in front of his face while photographing but rather the camera can be held in a more comfortable position with its bulk situated below the photographer's eyes. Further, if the viewfinder is located next to the objective, the camera is in use in a position in front of the body of the photographer with the photographer looking down into the viewfinder and the optical axis of the objective assumes an essentially vertical position. The center of gravity of the device as a whole is relatively close to the photographer so that the resulting force moments are of low magnitude and can be easily managed by the photographer. This is of particular importance in a photographic session of lengthy duration.

An advantage which attaches to apparatus in accordance with the invention is the fact that light beams required for the photography are only reflected by a mirror which is in a location resulting in minimal effect on the image quality.

The additional cost occasioned by the construction of the viewfinder in the form of a tube is moderate.

The arrangement according to the invention makes it easy to bring the eyepiece of the viewfinder to eye level while the camera itself remains in a position which allows good support. The support of the camera can be facilitated, for example, by appropriate carrying straps in the form of a shoulder harness or body straps or even by the photographer wearing an item of clothing such as a vest or the like equipped with supporting means.

The viewfinder can be in the form of a telescope or in a further embodiment of the invention, it is proposed that the viewfinder be constructed in the form of a periscope. The result of the latter construction is that the photographer can maintain his normal head attitude in which he looks at the image in the viewfinder with one eye and may direct the other eye directly at the target. With a periscope viewfinder, as a rule, the light being passed is deflected by 90° twice, each time by a mirror assembly. While this may diminish the optical quality of the viewfinder image, the photograph itself is unaffected.

It is clear that the erect, normal body position in which the arms assume a position which can be maintained without fatigue, establishes conditions for a good photograph, since the danger of blurring resulting from unsteadiness is greatly reduced in this body position. Also, it is possible to maintain this body position for a relatively long time and thus to watch the object through the viewfinder for a long time as necessary for many photographs.

It is advantageous for the top part of the objective to project above the viewfinder. In the arrangement according to the invention, this results in the light-admitting end of the objective being at a height which for example, can extend over a crowd. This creates additional opportunities for picture taking under unfavorable external conditions.

The use of mirrors in photography is known as is the use of the above-mentioned type of mirror in the light-admitting end of the objective. The construction of the prior art devices have as their objects, for example, taking pictures "around a corner" or from a more or less concealed position, or by means of a kind of foxhole periscope or other periscope to establish a more favorable position for the entrance opening of the objective. The solution of a problem which would be comparable to that of the invention has not been attempted by these means.

In a preferred embodiment of the invention the objective has a light deflecting mirror at the light admitting end with the light-admitting opening of the objective having an axis perpendicular to the general length of the tubular objective, i.e., with the axis of the opening being substantially parallel to the film plane.

DESCRIPTION OF DRAWINGS

FIG. 1 shows camera apparatus according to the invention with the objective and viewfinder in the positions in which they are used, and FIG. 2 is a cross-sectional view of the apparatus.

DETAILED DESCRIPTION OF PREFERRED EMBODIMENT

As shown in FIG. 1, the photographer 1 carries for example, shoulder and hip straps 2 and 3, to which a support element 4 is attached which serves to support the camera 5. This camera comprises a viewfinder 10, an objective 16, and a film carrier in the form of a cassette 6 with a film 7 which in the arrangement shown is in the typical horizontal use position. A swinging mirror 8 is pivotal around a hinge 9 and a ground glass plate 11 is provided on which the image is viewed by means of the viewfinder.

The viewfinder, which is in the form of a periscope, has a mirror 12 at its lower end. It includes an optical system 13 and an eyepiece 14. Deflecting mirror 15 is placed between the optical system and the eyepiece.

The entire viewfinder 10 can, if desired, be assembled as a unit which would include the mirror 12 and this unit may be removably attached to the camera. The viewfinder can also be integrally affixed to the camera and/or can have a telescopic i.e., collapsible construction in order to minimize the space requirement in the event of transport.

The objective of long focal length is designated 16 and comprises an optical system consisting of parts 17, 18, and 19. At the upper end of the objective is a mirror 20 and a light-admitting opening 21 which is preferably covered with a transparent disc, not shown, in order to keep out contamination. The diaphragm of the objective is designated 22.

The objective 16 has a focusing device which is not shown in detail and which for example is adjustable by means of a cylindrical tube 23, FIG. 1.

FIG. 1 makes clear the advantages of the invention. The camera with the objective and viewfinder is in such a position in front of the photographer 1 that the camera can be easily operated with one hand while the other hand operates the focusing device. The distance between the central plane 24 of the photographer and the optical axis 25 of the main part of the objective is relatively small so that the photographer basically need only support the weight of the device, i.e., he need not exert himself against substantial turning moments as when the objective is held horizontally. This is substantially facilitated by the straps 2 and 3.

The optical axis 26 of the viewfinder is parallel to the optical axis 25 of the objective.

The invention can be modified in various ways although it is suggested that the embodiments according to the drawing affords the most satisfactory result. As an example of a modification, the viewfinder can be simplified such that the photographer looks down into it, with his head bent. This however, would have the disadvantage of an inconvenient and uncomfortable head position. Also in this case, the target object would not be easily followed with the free eye.

Deviations can be made from the exact parallel configuration of axes 25 and 26 without disadvantage, within limits, and in another variant of the invention the viewfinder can be located beside the objective so that the distances from the optical axes 25 and 26 to the central plane 24 are approximately equal.

In the embodiment shown in the drawings, the objective is longer than the telescopic viewfinder so that the opening 21 is displaced upwardly which affords the advantage of being able to photograph over a crowd. Good results may be achieved, however, if the lengths of the objective and the viewfinder are approximately the same.

The objective can be attached integrally and rigidly to the camera or this attachment can be accomplished removably as is provided by known means so that the objective as well as the viewfinder can be combined with whatever camera might be chosen.

For taking a photograph, the image on the ground glass screen 11 is viewed by a viewfinder in multiple magnification. For exposure, the mirror 8 is flipped away around hinge 9 so that the image can fall on the film 7.

While only a single preferred embodiment of the invention has been described in detail, it will be appreciated that numerous modifications are possible within the scope of the invention as defined in the appended claims.

What I claimed is:

1. Portable photographic camera apparatus comprising a tubular objective of long focal length having a light-admitting end and a film carrier end, a tubular viewfinder having a junction with said objective between said film carrier end and said light-admitting end, said viewfinder being positioned adjacent said objective, said viewfinder and said objective having parallel longitudinal axes throughout most of their lengths, said viewfinder extending from said junction towards said one end of said objective and terminating in an eyepiece located longitudinally between said carrier end and said light-admitting end of said objective, and a light deflecting mirror means at the junction between said objective and said viewfinder for directing light rays from said light-admitting opening to said eyepiece.

2. The apparatus as defined in claim 1 wherein said viewfinder is detachable from said objective.

3. The apparatus as defined in claim 1 or 2 wherein said viewfinder is in the form of a periscope.

4. The apparatus of claim 1 including a light-admitting opening at said light-admitting end of the objective, said opening having an axis substantially perpendicular to the length of the objective and a further light deflecting mirror means at said light-admitting end for directing light from said opening towards said film carrier end.

5. The apparatus of claims 1, 2 or 4 further comprising a support element secured to said film carrier end and strap means secured to said support element for supporting the camera on the body of a photographer.

* * * * *